United States Patent [19]

Edwards

[11] 4,295,713
[45] Oct. 20, 1981

[54] FILM AND PHOTOGRAPHIC APPARATUS

[75] Inventor: Evan A. Edwards, Pittsford, N.Y.

[73] Assignee: Eastman Kodak Company, Rochester, N.Y.

[21] Appl. No.: 138,481

[22] Filed: Apr. 9, 1980

Related U.S. Application Data

[62] Division of Ser. No. 20,283, Mar. 14, 1979.

[51] Int. Cl.³ .............................................. G03C 1/76
[52] U.S. Cl. .................................... 352/235; 242/195; 352/241
[58] Field of Search ............... 352/129, 233, 235, 241, 226/91-92; 242/71-71.6, 195, 188; 354/206, 213, 275

[56] References Cited

U.S. PATENT DOCUMENTS

| | | | |
|---|---|---|---|
| 1,561,941 | 11/1925 | Merle | 352/235 |
| 2,559,892 | 7/1951 | Mihalyi et al. | 242/71 |
| 2,898,805 | 8/1959 | Solow et al. | 352/235 |

FOREIGN PATENT DOCUMENTS 1156639 10/1973 Fed. Rep. of Germany ...... 354/206

Primary Examiner—L. T. Hix
Assistant Examiner—Thomas H. Tarcza
Attorney, Agent, or Firm—Milton S. Sales

[57] ABSTRACT

A film magazine contains a roll of film having an image portion and a leader. The filmstrip is perforated at predetermined intervals with larger perforations in the image portion than in the leader. A camera mechanism is disclosed which uses the perforations to advance the filmstrip, detects the size of the perforations, and meters only when a large, image portion perforation is advanced to a predetermined position in the camera.

2 Claims, 12 Drawing Figures

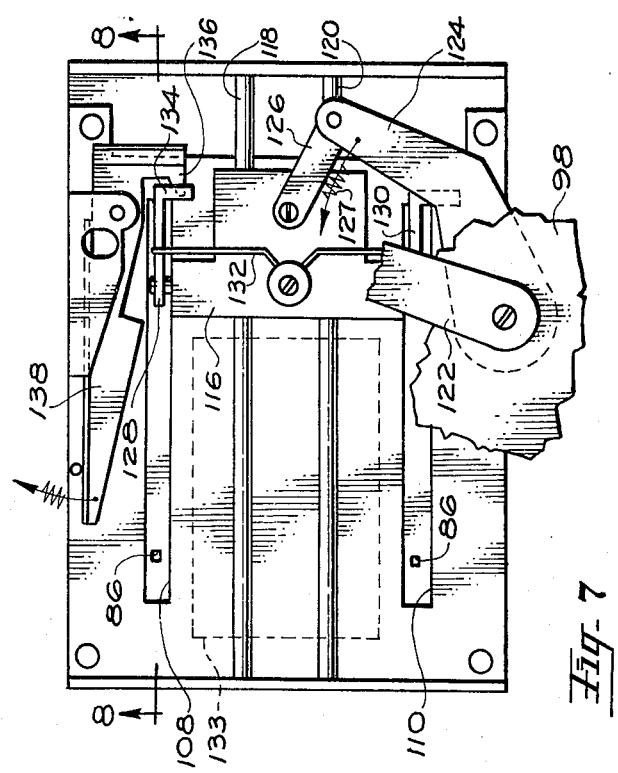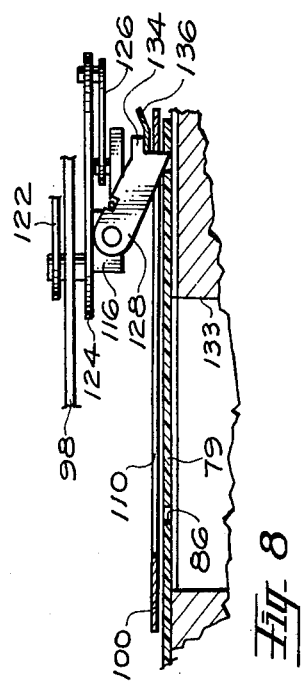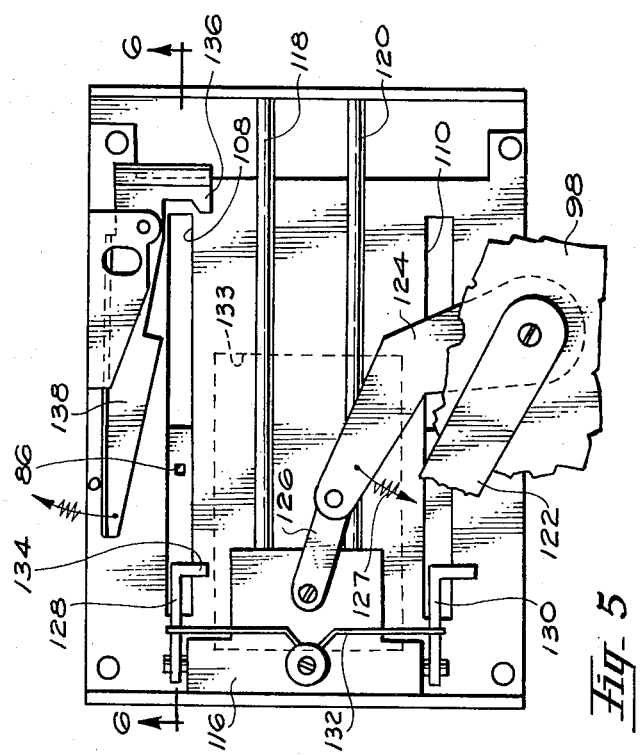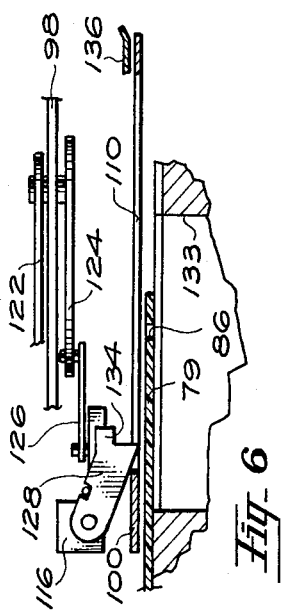

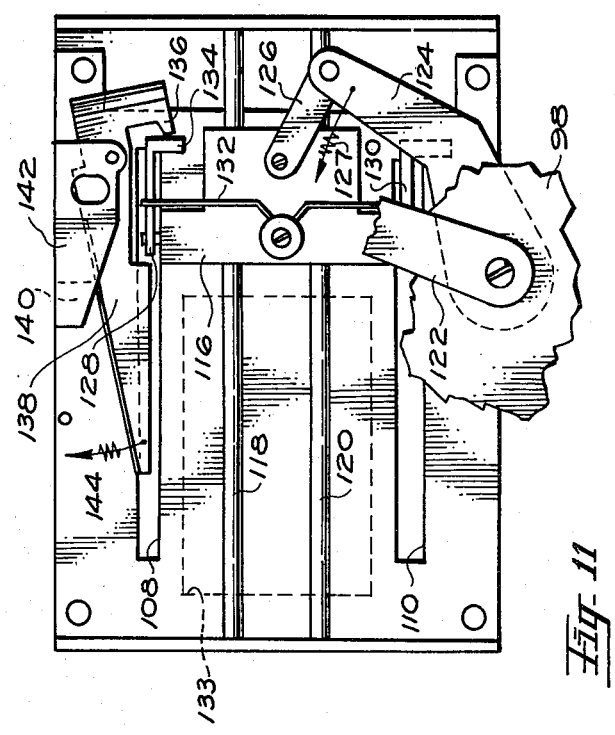
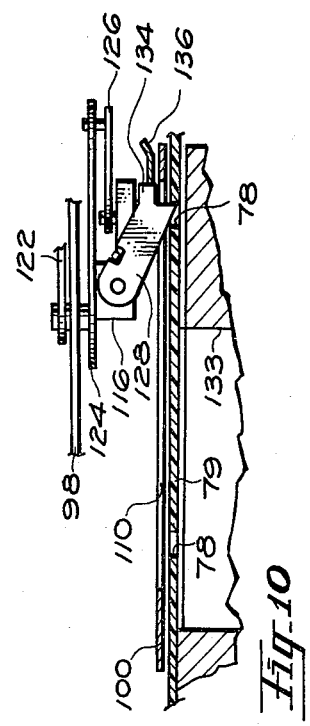
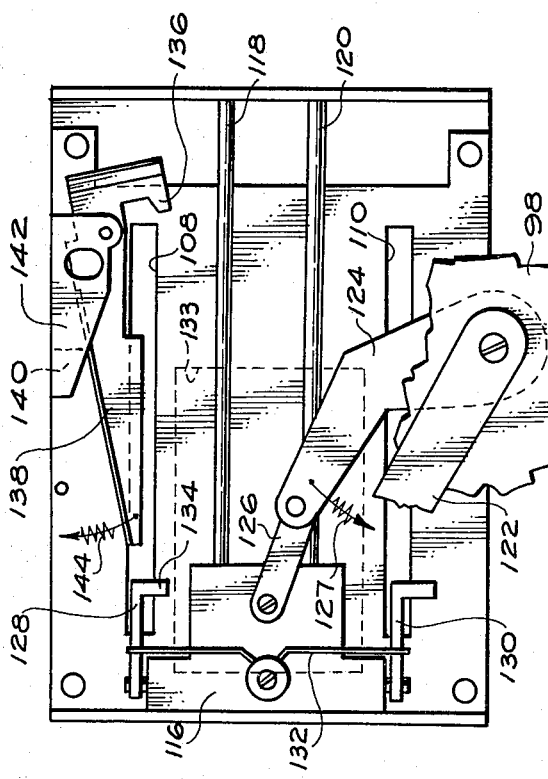
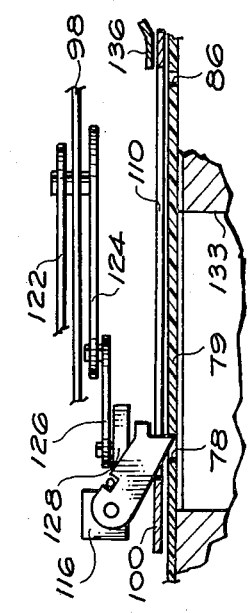

FILM AND PHOTOGRAPHIC APPARATUS

This is a division of application Ser. No. 020,283, filed Mar. 14, 1979.

BACKGROUND OF THE INVENTION

1. Field of the Invention

The present invention relates to a new photographic film format, and to cameras and other photographic apparatus adapted to receive film having such a format.

2. Description of the Prior Art

Distinctions have been made between those film housings referred to as magazines, cartridges, cassettes, etc. But, for the purpose of this disclosure and the appended claims, the term "magazine" is intended to refer to any housing for roll film which is loadable into photographic apparatus.

Film housed in a magazine is usually provided with a leader which extends from the magazine's film exit passageway. Generally, the leader is either attached to a take-up core in the magazine itself, or is intended to be attached to a take-up core in the photographic apparatus. When the take-up core is rotated, the film is pulled through the exposure position of the photographic apparatus.

Such arrangements, wherein the film is transported by rotation of a take-up core, lend themselves to metering apparatus which temporarily disables the transport mechanism when a perforation is detected at a predetermined location along the film path. Such metering apparatus is commonly used in cameras adapted to receive film which has one perforation per image area and no perforations in the leader, such as size 126 and size 110 film. The absence of perforations in the leader permits the leader to be advanced through the gate without metering the camera.

While such arrangements are suitable for double-ended magazines or for cameras wherein the leader is attachable to an internal take-up core, some cameras, such as shown in U.S. Pat. No. 2,559,892, are adapted to receive a single-ended magazine without attachment of the leader to any take-up core. The camera shown in that patent advances the film into a coreless take-up chamber by a set of claws which enters film perforations in both the leader and the image portion of the filmstrip. If a metering mechanism is activated by the presence of such perforations at a predetermined position in the camera, the presence of perforations in the leader would cause the metering mechanism to activate before the image portion of the filmstrip has been advanced to the camera's exposure position.

SUMMARY OF THE INVENTION

In accordance with the present invention, a filmstrip with an image portion and a leader has at least one row of perforations extending along both the leader and the image portion. The perforations in the image portion have a characteristic, such as size or shape, different from those in the leader. Photographic apparatus for use with the film have transport mechanisms and means to distinguish between the perforation characteristics. The transport mechanism is activated to advance the filmstrip until the first image area is at the exposure position, whereupon the photographic apparatus detects the presence of an image portion perforation and activates metering means to releasably disable the transport mechanism.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIGS. 5, 7, and 9–12 are views of the film transport and metering mechanisms of the camera of FIG. 4 showing the sequence of operation of the mechanisms; and FIGS. 6 and 8 are sectional views taken along lines 6—6 and 8—8 of FIGS. 5 and 7, respectively.

DESCRIPTION OF THE PREFERRED EMBODIMENT

Because filmstrips, magazines, and cameras are well known, the present description will be directed, in particular, to elements forming part of, or cooperating more directly with, apparatus in accordance with the present invention. It is to be understood that filmstrip, magazine, and camera elements not specifically shown or described may take various forms well known to those skilled in the art.

Figure 4:
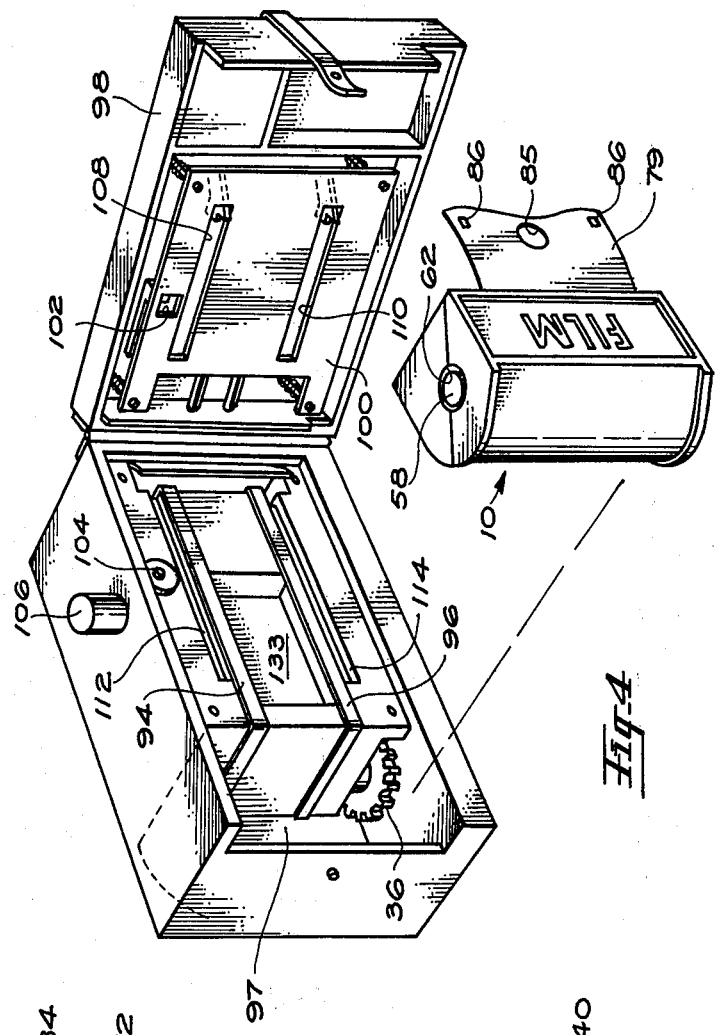
FIG. 4 is a perspective view of a camera and film magazine in accordance with the present invention.
Figure 1:
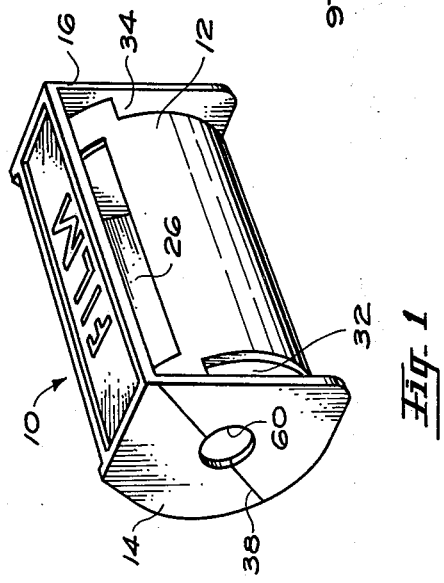
FIG. 1 is a perspective view of a film magazine for use with the filmstrip and photographic apparatus in accordance with the present invention.

A film magazine 10 is shown in FIG. 1. The magazine consists of an annular wall 12 and a pair of opposed end walls 14 and 16 enclosing a film supply chamber. A passageway 26 communicates with the film supply chamber within magazine 10 so that a strip of film can be lead from, and rewound into, the chamber. Two other openings 32 and 34 provide access to the interior of the magazine by a camera's rewind drive gear 36 which is shown in FIG. 4.

Figure 2:
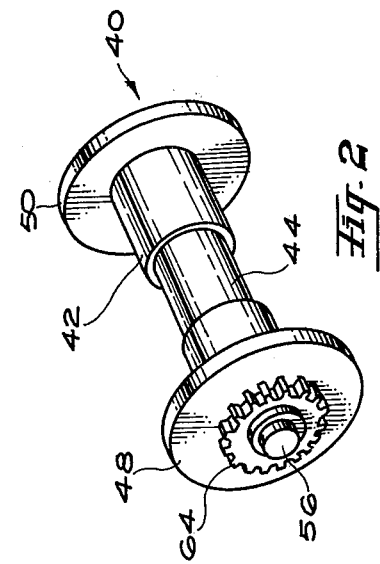
FIG. 2 is a perspective view of a reel adapted to be rotatably supported within the magazine of FIG. 1.

Preferably, magazine 10 is manufactured in two parts, as indicated by separation line 38, for assembly around a roll of film wound on a reel 40 (FIG. 2). Reel 40 is rotatably supported within magazine 10 by a pair of posts 56 and 58 (FIGS. 2 and 4, respectively) which fit into respective holes 60 and 62. Rewind gears 64 on reel 40 are positioned to align with magazine openings 32 and 34, respectively, when the magazine is assembled. Two gears are provided so that the camera designer can locate camera rewind drive gear 36 (FIG. 4) in alignment with either end of the magazine. Drive gear 36 can be operated by a conventional crank-type rewind apparatus on the bottom or top of the camera.

Figure 3:
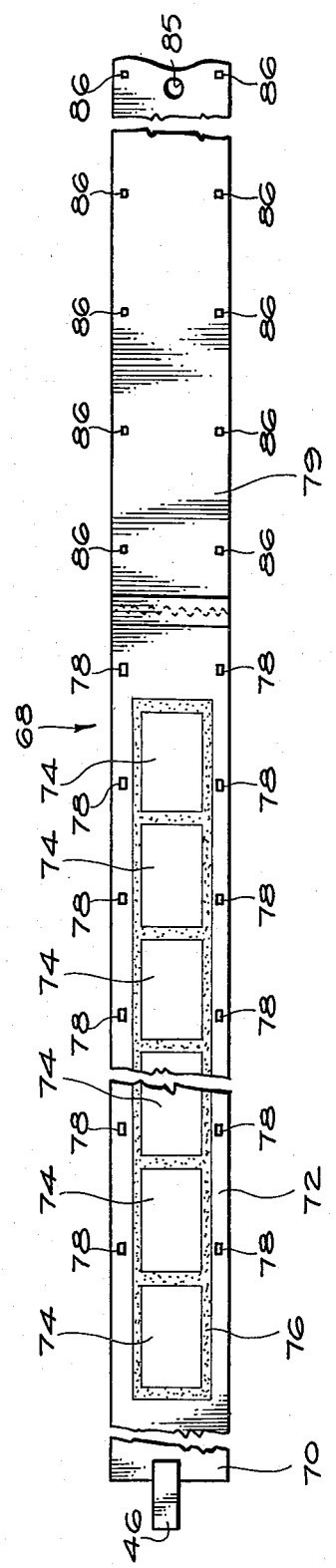
FIG. 3 is a partially broken away view of a filmstrip in accordance with the present invention.

A filmstrip 68 adapted to be received in magazine 10 is shown in FIG. 3. The filmstrip has three general areas distinguished by physical characteristics or intended function, or both. Beginning at the left of FIG. 3, the filmstrip has a trailer portion 70 which is attached in recess 44 of reel 40 (FIG. 2) by tape 46. An image portion 72 of the filmstrip has a plurality of image areas 74 with preexposed latent-image borders 76. Film perforations 78 are provided at predetermined metering intervals along the filmstrip so that the image areas may be accurately positioned along a camera's film plane. The perforations may subsequently be used during the printing and/or cutting operations to locate the film. A perforation has been provided on each lateral side of the frames to give the camera designer additional flexibility in locating the metering mechanism.

A leader 79 has a hole 85 near its free end. The hole is not used when the magazine is loaded into a camera of the type illustrated, but may be used to attach the leader to the take-up core of cameras such as shown in U.S. Pat. No. 3,383,068.

The preferred method of film transport which will be explained hereinafter utilizes a plurality of perforations 86 along the edges of the film leader. The leader perforations are aligned with image portion perforations 78, but the leader perforations are shorter in the filmstrip's longitudinal direction than the image portion perforations. In the illustrated embodiment, leader perforations 86 are about sixty percent of the length of perforations 78. However, the exact difference in perforation size is not critical as long as there is sufficient difference for distinction by the camera apparatus, as will be explained hereinafter.

The method for light-locking the magazine chamber is not shown, but conventional plush may be used or filmstrip leader 79 may have a wide region, and reel flanges 48 and 50 may be stepped as disclosed in my copending, commonly assigned U.S. Application Ser. No. 20,283, entitled Filmstrip and Film Magazine and filed concurrently herewith.

A camera for use with the magazine and filmstrip is shown in FIGS. 4-12. In FIG. 4, a magazine is shown being loaded into an open camera. A short length of leader 79 extends from magazine casing 10 to rest upon the camera's film support rails 94 and 96. Rewind drive gear 36 enters gear opening 32 (FIG. 1) to mesh with rewind driven gear 64 as the magazine enters the camera's supply chamber 97.

When the film is loaded in the particular illustrated camera, leader 79 need not be manually fed to the camera's take-up chamber or attached to a take-up core before the camera's door is closed. The operator need only drop the magazine into the supply chamber, close the camera's door 98, and activate the camera's film transport mechanism. The features of the film and the camera which make this ease of operation possible will be explained in detail.

Camera door 98 carries a pressure pad 100 mounted for movement in a fore and aft direction on four studs. Coil springs on the studs behind the pressure plate urge the plate forwardly to hold the film flat against rails 94 and 96. An opening 102 in pressure pad 100 aligns with a pin 104 which moves rewardly from the camera back when a shutter release button 106 is depressed to actuate the camera's exposure mechanism. Pin 104 deactivates the camera's film metering mechanism and cooperates with other structure to prevent double exposures, as will be explained hereinafter.

A pair of slots 108 and 110 in pressure pad 100 are respectively aligned with elongated recesses 112 and 114 in the camera back. The slots and recesses are spaced apart a distance equal to the lateral spacing between the perforations along the filmstrip.

Referring to FIG. 5, a slider 116 is mounted on a pair of rails 118 and 120 for movement along the rails in the space between pressure pad 100 and camera door 98. A crank handle 122 is accessible from outside the camera and can be rotated in a clockwise direction as viewed in FIG. 5 to move slider 116 by means of an arm 124 and link 126. The slider is urged toward its FIG. 5 position by spring means 127.

Two claws 128 and 130 are pivotally mounted on slider 116 in alignment with slots 108 and 110. A spring 132 urges the claws through the slots, through any film perforation aligned with the claws, and into recesses 112 and 114.

FIGS. 5-12 are a series of drawings showing the sequence of operation of the camera's film transport mechanism and metering means. In FIGS. 5 and 6, the camera has just been loaded as explained previously with respect to FIG. 4. Back door 98 has been closed, and leader 79 extends partially across the camera's exposure aperture 133.

Slider 116 is in its extreme leftward position and claws 128 and 130 are held away from leader 79 by engagement with pressure pad 100. As crank 122 is rotated clockwise, slider 116 is pulled to the right against spring 127, and claws 128 and 130 slide across leader 79 until they fall into leader perforations 86. Further rotation of crank 122 begins to draw additional leader from the film magazine. At the end of the first stroke (FIGS. 7 and 8), a second set of leader perforations 86 have entered the area below slots 108 and 110. Note that a pin 134 on claw 128 is positioned above, and does not contact, a projection 136 on a metering lever 138. As will be explained hereinafter, non-alignment of pin 134 and projection 136 prevents actuation of the camera's metering means as long as the film's leader (and not image portion) is being advanced past aperture 133. When crank 122 is released by the operator, claws 128 and 130 withdraw from the film perforations and slide upon the leader surface back to their positions shown in FIGS. 5 and 6.

The operator repeats the described operation until a large perforation 78 first appears below each slot 108 and 110. Then, upon initiation of the next rotation of crank 122, the claws move away from contact with pressure pad 100 and fall into perforations 78 (FIG. 9). Note that these perforations are large enough to allow the claws to fully enter the perforations so that pin 134 rests on the rear surface of pressure plate 100 and aligns with projection 136 on metering lever 138.

As the operator continues to rotate crank 122, the claws draw filmstrip 68 from magazine housing 10 until just before the first image area 74 on the filmstrip is aligned with the camera's exposure aperture 133. Pin 134 of claw 128 contacts projection 136 of metering lever 138 (FIG. 10) and rotates the lever in a counterclockwise direction to the position shown in FIG. 11 as the image area comes into alignment with the exposure aperture. A blocking member 140 on a spring arm 142 snaps behind the metering lever to hold it against the bias of a spring 144 when the operator releases crank 122 and slider 116 returns to its FIG. 12 position.

Now the camera is ready to be actuated to take a picture, and the film transport mechanism cannot be operated until an exposure has been made; that is, if the operator tries to rotate crank 122, claw 128 will abut against the end of metering lever 138 to prevent further movement of the crank.

When shutter release button 106 is depressed to take a picture, pin 104 (FIG. 4) moves rewardly through opening 102. The pin engages blocking member 140 to push it out of the way of metering lever 138 so that the lever can snap back under the influence of spring 144 to its FIG. 5 position when pin 104 moves forwardly in the camera.

After an exposure, shutter release button 106 cannot be again depressed because movement of pin 104 is blocked by metering lever 138 which covers opening 102. Accordingly, double exposure of the frame at exposure aperture 133 is prevented.

After the last exposure has been made, that frame will not be advanced beyond exposure aperture 133 by actuation of the film transport mechanism because there are no additional perforations in the filmstrip and claws 128 and 130 merely ride along the surface of the filmstrip. Now, the filmstrip is ready to be rewound into magazine 10 by means of rewind drive gear 36. Note that during rewind, claws 128 and 130 are held out of contact with the film by means of pressure pad 100. An "end of film" notch, not shown, may be provided after the last frame so that cameras equipped with suitable detectors may be conditioned automatically for rewind.

The invention has been described in detail with particular reference to a preferred embodiment thereof, but it will be understood that variations and modifications can be effected within the spirit and scope of the invention.

What is claimed is:

1. In a photographic filmstrip having an image portion and a leader; the improvement comprising:
    at least one row of perforations of a pre-determined size along the image portion; and
    at least one row of perforations in the leader, said perforations in the leader being aligned with and smaller in a direction longitudinally of said filmstrip than the perforations along the image portion.

2. In a filmstrip adapted for use with photographic apparatus of the type having (1) a transport mechanism for advancing the filmstrip, (2) means for sensing perforations in the filmstrip and for distinguishing between different sized perforations, and (3) means for metering the transport mechanism upon detection of a perforation of at least a predetermined size; the improvement in said filmstrip comprising:
    an image portion having perforations of at least said predetermined size at metering intervals along said image portion; and
    a leader having perforations of less than said predetermined size spaced therealong, whereby the transport mechanism will not be metered upon the perforations in said leader being sensed and will be metered upon the perforations in said image portion being sensed.

* * * * *

UNITED STATES PATENT AND TRADEMARK OFFICE
CERTIFICATE OF CORRECTION

PATENT NO. : 4,295,713
DATED : October 20, 1981
INVENTOR(S) : Evan A. Edwards

It is certified that error appears in the above—identified patent and that said Letters Patent is hereby corrected as shown below:

Column 3, lines 27 and 28, delete "20,283" and insert
--20,284--.

Column 3, line 29, delete "herewith" and insert --with the parent hereof--.

Signed and Sealed this

Tenth Day of August 1982

[SEAL]

Attest:

Attesting Officer

GERALD J. MOSSINGHOFF

Commissioner of Patents and Trademarks